United States Patent Office 3,437,716
Patented Apr. 8, 1969

3,437,716
PROCESS FOR ACCELERATING POLYMERIZATION OF ETHYLENICALLY UNSATURATED MONOMERS USING TRIVALENT ANTIMONY COMPOUNDS
John R. Leebrick, Old Lyme, Conn., assignor, by mesne assignments, to Cosan Chemical Corporation, Clifton, N.J., a corporation of New Jersey
No Drawing. Filed Dec. 13, 1966, Ser. No. 601,307
Int. Cl. C08f 1/72, 1/74, 21/00
U.S. Cl. 260—863         10 Claims

ABSTRACT OF THE DISCLOSURE

Ethylenically unsaturated monomers or resins are polymerized with catalysis by a hydroperoxide, accelerated by 1 to 50% by weight, based on the weight of the hydroperoxide, of antimony trichloride or tri-isooctylthioglycollate.

---

The present invention is directed to a process for accelerating peroxide catalyzed polymerization of ethylenically unsaturated monomers and of partially polymerized resins containing unsaturated sites which are polymerized in a final curing operation by the use of trivalent antimony compounds and in particular to the use of such compounds wherein the anionic moiety is selected from the group consisting of halide, carboxylate, alkoxide, mercaptide and mercaptoester.

Various peroxides are used to catalyze the polymerization of the above ethylenically unsaturated monomers and partially polymerized resins. Polymerization rates are influenced by catalyst concentration and temperature. These rates vary with the respective ethylenically unsaturated monomers. Polymerization accelerators are widely used to speed up polymerization and provide harder cures. These accelerators can be generally grouped as to low or high cost accelerators. Cobalt naphthenate is typical of the low cost accelerators, which although speeding up polymerization and providing hard cures, suffer from certain disadvantages such as coloration, non-uniform cures and hazy or cloudy surfaces. These shortcomings severely limit the application of these accelerators from many uses. For example, cobalt naphthenate, depending on the concentration used, results in a pink to deep violet color in the polymerized resin product.

It is therefore an object of this invention to provide a process for accelerating the peroxide catalyzed polymerization of ethylenically unsaturated monomers and partially polymerized resins containing unsaturated sites.

It is a further object of this invention to provide a low cost accelerator for peroxide catalyzed polymerization of unsaturated monomer and partially polymerized resins which results in uniform cures and clear, sparkling surfaces.

I have discovered that polymerization of monomers and resin combinations containing ethylenically unsaturated sites is accelerated when a small amount of a trivalent antimony compound is used as the accelerator in conjunction with a hydroperoxide catalyst. These trivalent antimony compounds of the present invention have the general formula: $Sb(A)_3$ wherein A is an anionic moiety selected from the group consisting of halide, carboxylate, alkoxide, mercaptide, and mercaptoester. Preferred anionic moieties are the chloride, bromide, lauryl-mercaptide, butoxide, isooctyl mercaptoacetate and the 2-ethylhexoate.

Equally effective and equivalent in performance are those compounds which include a radical attached to the antimony having 1 to 18 carbon atoms in the chain and having the general formula: $R_nSbA_{3-n}$, wherein R is selected from the group consisting of alkyl, alkenyl, alkynyl, cycloalkyl, and aryl radicals.

Typical R groups are methyl, propyl, butyl, octyl, 2-ethylhexyl, octodecyl, phenyl, vinyl, cyclohexyl, butenyl, ethynyl, dodecylbenzyl, p-chlorophenyl and benzyl. Preferred R groups are butyl, octyl, cyclohexyl, and phenyl.

Although all of the antimony compounds described above function as accelerators, their efficacy will depend upon the particular compound and amount used and the monomer or resin and catalyst system with which it is used. The selection of a preferred accelerator for a given application is further dependent upon the reactivity or solubility of the accelerator in the given system.

Trivalent antimony compounds are effective accelerators for the polymerization of ethylenically unsaturated monomers and partially polymerized resins utilizing hydroperoxides as catalysts (peroxides having one or more terminal OOH groups). Methylethylketone peroxide and cumene hydroperoxide have wide commercial use. Other useful hydroperoxides include t-butyl hydroperoxide, cyclohexyl peroxide, p-methane hydroperoxide, 2,5-dimethylhexane-2,5-dihydroperoxide.

Trivalent antimony compounds accelerate the peroxide catalyzed polymerization of a wide variety of ethylenically unsaturated monomers. They are highly effective with polyester and polyester styrene resins. Polyesters are prepared by the reaction of polyhydric alcohols with polycarboxylic acids. Typical reactants are ethylene glycol and maleic anhydride. The addition of styrene provides a cross-linked structure and hard cures. Methylmethacrylate and diallylphthalate may be used in lieu of styrene in the partially polymerized systems. Trivalent antimony compounds also accelerate the peroxide catalyzed polymerization of ethylenically unsaturated monomers typified by butadiene, styrene, isoprene, ethylene, vinylchloride, acrylates, methacrylates and co-monomers of the foregoing.

In a typical polymerization wherein the monomers are frequently liquids, following the addition of a catalyst little initial increase in viscosity is noted. Gelation slowly occurs followed by a gradual hardening. The polymerization rate may be increased by raising the temperature. The use of trivalent antimony accelerators in conjunction with the catalyst shortens the cure time markedly, permits the use of lower temperatures and provides harder cures.

The amount of the trivalent antimony accelerator used in a given application is dependent upon the ethylenically unsaturated monomer or partially polymerized resin and catalyst utilized and to a certain extent upon the temperature used in carrying out the curing reaction. Generally between one to fifty percent by weight based on the amount of peroxide catalyst is effective to accelerate the polymerization rate. Preferred concentrations are between 2% and 20% by weight based on the peroxide. In order to give those skilled in the art a better understanding of the invention, the following illustrative examples are given.

Example 1

Samples of a liquid commercial polyester-styrene polymerizable resin were placed in small glass beakers and 2% by weight of methylethylketone peroxide was added to each sample with thorough stirring. Various amounts of an accelerator (1:1 antimony trichloride:toluene solution) were added and curing was carried out at room temperature and at 60 degrees C. while the samples were being continuously observed and the following results noted:

| Sample | Accelerator percent by weight on peroxide, solid basis | Temperature (° C.) | Gel time (min.) | Remarks |
|---|---|---|---|---|
| A | None | Room | >180 | Soft. |
| B | 5 | Room | >180 | Semi-firm. |
| C | 10 | Room | 180 | Hard. |
| D | 12.5 | Room | 180 | Do. |
| E | 50 | Room | 180 | Firm. |
| F | 100 | Room | 180 | Soft. |
| G | None | 60 | 28 | Do. |
| H | 10 | 60 | 10 | Hard. |
| I | 5 | 60 | 12 | Do. |
| J | 2.5 | 60 | 19 | Do. |

Example 2

Additional samples were prepared as in Example 1 and cured at a temperature of 60° C. except that the accelerator was antimony tri isooctylthioglycollate. The following results were obtained:

| Sample | Acceleartor percent by weight by peroxide, solid basis | Gel time (min.) | Remarks |
|---|---|---|---|
| A | None | 28 | Soft. |
| B | 20 | 2 | Hard. |
| C | 10 | 10 | Do. |

From the above examples, it is observed that while the catalyst resin system alone failed to achieve a hard cure even after three hours at room temperature, the addition of small amounts of accelerator of the present invention resulted in a hard cure. Furthermore, when the temperature was elevated even small amounts (2.5%) of added accelerator provided a hard cure which could not be achieved by the catalyst resin system alone even though it was reacted for a 47% longer time period.

It was also observed that due to the speed, clarity and uniformity of the cure using the accelerator of the present invention, markings on the interior of the glass beakers were reproduced on the cured product with excellent definition, which was not achieved when a similar sample was prepared using cobalt naphthenate as the accelerator.

While I have described my invention in relation to illustrative examples, it is to be understood that many modifications and variations will be apparent to those skilled in the art and that the invention includes all such modifications and embodiments which may come within the scope of the appended claims.

What I claim is:

1. In the process of polymerizing a material selected from the group consisting of ethylenically-unsaturated resins and mixtures thereof with ethylenically-unsaturated monomers, using a hydroperoxide catalyst, the improvement comprising accelerating the rate of said polymerization by incorporating therein in a range of from 1 to 50 percent by weight of said hydroperoxide, solid basis, antimony trichloride or antimony tri-isooctylthioglycollate.

2. The process of claim 1 wherein said antimony compound is antimony trichloride.

3. The process of claim 2 wherein said hydroperoxide is methylethylketone peroxide.

4. The process of claim 2, wherein said hydroperoxide is cumene hydroperoxide.

5. The process of claim 1 wherein said antimony compound is antimony tri isooctylthioglycollate.

6. The process of claim 5 wherein said hydroperoxide is methylethylketone peroxide.

7. The process of claim 5 wherein said hydroperoxide is cumene hydroperoxide.

8. The process of claim 1 wherein said hydroperoxide is methylethylketone peroxide.

9. The process of claim 1 wherein said hydroperoxide is cumene hydroperoxide.

10. The process of claim 1 wherein said antimony compound is incorporated in the range of from 2 to 20 percent by weight of said peroxide, solid basis.

References Cited

UNITED STATES PATENTS 3,373,225   3/1968   Degginler _____ 260—863

FOREIGN PATENTS 249,956    8/1962   Australia.
1,171,729  1/1959   France.
1,196,645  11/1959  France.
837,696    6/1960   Great Britain.
1,128,663  4/1962   Germany.
1,130,164  5/1962   Germany.

SAMUEL H. BLECH, *Primary Examiner.*

JOHN T. GOOLKASIAN, *Assistant Examiner.*

U.S. Cl. X.R.

260—865, 446, 75, 94.3, 93.5, 94.9, 92.8, 89.5